Feb. 21, 1939. R. N. DOBLE 2,147,831
TEA BAG, COFFEE BAG, AND THE LIKE
Filed Sept. 10, 1937

Inventor.
Ralph N. Doble
by Heard Smith & Tennant.
Attys.

Patented Feb. 21, 1939

2,147,831

UNITED STATES PATENT OFFICE 2,147,831

TEA BAG, COFFEE BAG, AND THE LIKE

Ralph N. Doble, Hingham, Mass.

Application September 10, 1937, Serial No. 163,239

6 Claims. (Cl. 99—77.1)

This invention relates to tea bags, coffee bags and the like such as are designed for use in making individual cups of tea, coffee or other infusion.

One of the objects of the invention is to provide a novel method of constructing a bag suitable for use as a coffee bag or tea bag by which method the expense of making the bag can be reduced.

A further object of the invention is to provide a novel coffee bag or tea bag which will be sufficiently impervious to the passage therethrough of the dust of the tea leaves or the coffee grounds to meet the requirements of a coffee bag or tea bag, but which will provide the desirable vent for the escape of gas from the bag when it is used in a coffee bag in making an individual cup of coffee.

The immersion of ground coffee in hot water results in the generation of a small quantity of gas which if allowed to accumulate in the coffee bag will prevent the circulation of water therethrough which is necessary to form a satisfactory cup of coffee. The provision of the vent above referred to permits such gas to escape and thereby overcomes this difficulty.

My invention may be embodied in bags of the "pouch" type or in bags of the so-called "sewed bag" type. As embodied in a "pouch" type of bag the bag blank from which the bag is made is constructed so that the body portion of the bag will be sufficiently impervious to the passage of the dust of tea leaves or of the ground coffee to meet the requirements of a coffee bag or a tea bag, but a portion of the wall of the bag adjacent the top will be more porous than the body of the bag and sufficiently porous to provide the necessary vent for the escape of the gases above referred to when making a cup of coffee. To accomplish this I propose to so form the blank that the edge portions thereof which are gathered together in the neck of the blank in forming the pouch bag, will be of more porous material than the body of the blank, the result being that when the bag is completed a portion thereof adjacent the neck is sufficiently porous to provide for the desired venting operation, while the body of the bag is of a character to prevent the passage therethrough of the fine dust of the tea leaves or the coffee grounds. Various materials may be used in making a bag embodying my invention having the portion of the walls thereof adjacent the mouth of the bag more porous than the portion of the wall forming the body of the bag.

When the bag is made from a bag blank of fabric the less porous portion of the blank is provided for by making the marginal portion of the blank of less closely woven fabric than the central portion which forms the body portion of the bag. The making of the blank with the marginal portion of a coarser weave than the central portion reduces the cost of the blank as less yarn is used in the weaving of the blank.

In making a "sewed" bag it is desirable to use a fabric blank which is sufficiently closely woven to hold the rather coarse stitches used in sewing the edges of the blank together, and a fabric which has this qualification may be more closely woven than is necessary for the body of the bag. As applied to a "sewed" bag my invention contemplates the use of a bag blank which has its central portion that forms the body of the bag sufficiently closely woven to meet the requirements of a tea bag or coffee bag, and which has the marginal edge portions that are sewed together more closely woven than the body portion so that said marginal edge portions will hold the stitches firmly. A blank of this construction can be produced at less cost than one having a central portion woven as closely as the marginal portion because of the fact that less yarn is used in weaving the bag.

In order to give an understanding of the invention I have illustrated in the drawing some selected embodiments thereof which will now be described after which the novel features will be pointed out in the appended claims.

Figure 1:
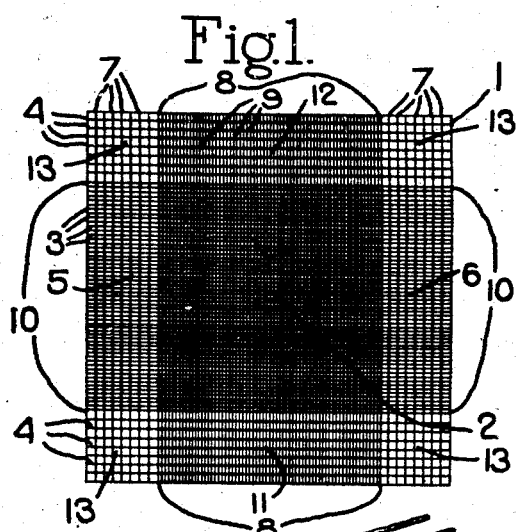
Fig. 1 is a view illustrating one type of blank which may be used in making a pouch bag embodying my invention.

Referring to Fig. 1, I indicates a blank from which the bag may be made and which is shown as a single-ply fabric. The fabric forming the blank is so woven that the central portion 2 thereof is of much finer weave than the edge portions. One way in which this could be accomplished is to so thread up the loom that the warp threads 3 at the central portion of the fabric are much more close together than the warp threads 4 at the edge portions of the fabric, and then to so weave the fabric that at each of the marginal portions 5 and 6 of the blank the picks 7 of filling thread will be widely spaced while at the central portion of the blank indicated at 8 the picks 9 are beaten closely together. A bag blank woven in this way will have the central portion 2 formed of closely woven warp threads 3 and filling threads 9, the central part 10 of each of the marginal portions 5 and 6 formed of closely spaced warp threads 3 but widely spaced filling threads 7, the portions 11 and 12 of the fabric formed of closely spaced filling threads 9 but widely separated warp threads 4, while the corner portions 13 of the blank will be formed of widely spaced filling threads 7 and widely spaced warp threads 4.

Figure 2:
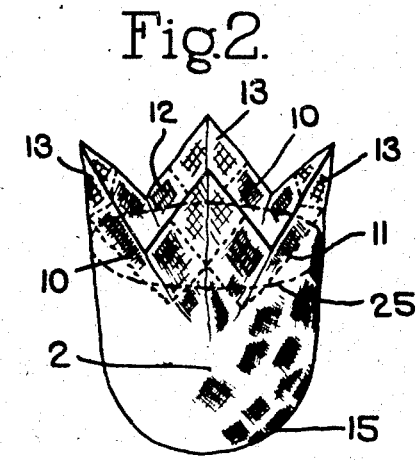
Fig. 2 illustrates the process of forming the blank into the bag shape.

One familiar way of making a tea bag or coffee bag 15 from a square blank, such as shown in Fig. 1, is to gather the four edges of the blank together and then to tie the edges in their gathered-together relation by means of a tie string 14 or other suitable fastening device. Fig. 2 shows the blank partially formed into a bag, and in the making of a coffee bag or tea bag the coffee, tea or other material from which the cup of infusion is to be made will be deposited into the bag when it is in the partially formed shape shown in Fig. 2, and thereafter the edges will be gathered tightly together and tied by the tie string 14 or other fastening device. In forming the bag 15 the tie string may be placed in approximately the position shown by the dotted lines 25 in Fig. 2 so that some part of the areas 10, 11, 12 of the blank will be located below the tie string 14 as indicated at 16 in Fig. 3. The fabric in these areas 10, 11, 12 is much coarser and more open than the fabric in the central portion 2 of the blank and hence when the bag is made the body portion thereof will be composed of the closely woven center portion 2 of the blank, while at the neck of the bag and immediately below the tie string 14 there will be portions of the bag wall formed of the coarser woven part of the blank such as shown at 10, 11, 12 in Fig. 1. The closely woven central portion of the blank provides a bag with a body portion which will prevent the passage therethrough of the dust of the tea leaves or of the coffee grounds, and the areas 16 of the wall of the bag which are exposed below the tie string will provide sufficient vent for the bag to allow the free escape of the gases formed when a cup of coffee infusion is being made. It will be understood that after the bag 15 has been filled and tied with the tie string 14 the projecting corners of the blank or the portion of the blank above the tie string will be cut off in the usual manner, thereby leaving the bag as shown in Fig. 3.

Figure 4:
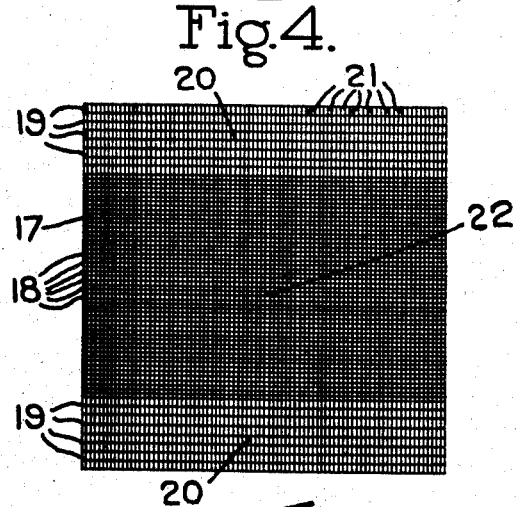
Fig. 4 is a view similar to Fig. 1 but showing a blank of a different construction.
Figure 5:
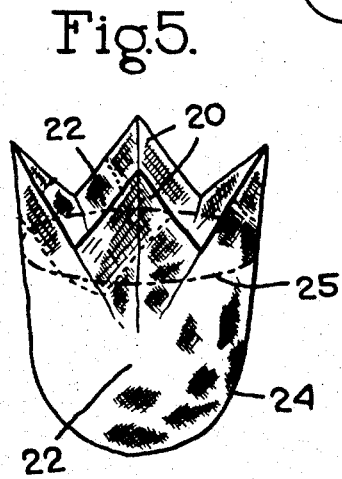
Fig. 5 is a view showing a step in the process of making the blank into a bag.
Figure 6:
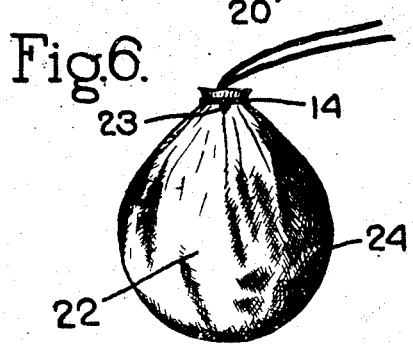
Fig. 6 is a view of the bag made from the blank shown in Fig. 4.

In Figs. 4 to 6 I have shown a bag embodying my invention but made from a slightly different bag blank. In this construction the bag blank which is shown at 17 is formed from a piece of cloth in which the warp threads 18 at the central portion are arranged closely together while the warp threads 19 at the marginal portions 20 are widely separated. In this embodiment the filling threads 21 are beaten up sufficiently close throughout the entire length of the warp threads so that the central portion 22 of the blank will have the necessary close formation to prevent the passage therethrough of the dust of tea leaves or of coffee grounds.

A tea bag or coffee bag 23 may be made from a blank such as shown in Fig. 4 in the same way as that above described, that is, by gathering the edges of the blank together and tying them tightly in their gathered-together relation with the tie string. By positioning the tie string 14 in approximately the position shown by the dotted lines 25 in Fig. 5 the bag will be made with some part of the coarser portions 20 of the fabric situated below the tie string, as indicated in dotted lines 23 in Fig. 6, and these coarser portions of the fabric will provide the desired vent.

Figure 3:
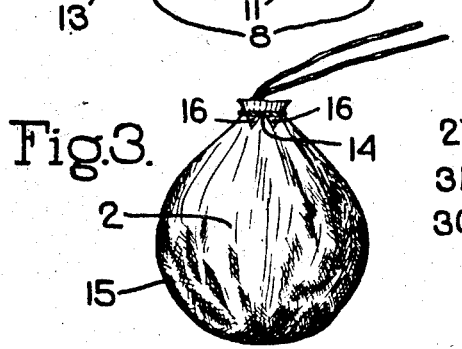
Fig. 3 is a view of the completed bag.

Bags such as shown in Figs. 3 and 6, and which are made from bag blanks such as shown in Figs. 1 and 4, represent a saving in cost over bags which are made from bag blanks that are woven so that the entire area of the bag blank is of the finely woven fabric represented by the central portions 2 and 22 of Figs. 1 and 4, this saving resulting from the fact that less thread is used in weaving the bag blanks of Figs. 1 and 4 than would be used if the entire blank area was of the closely woven fabric.

Figure 7:
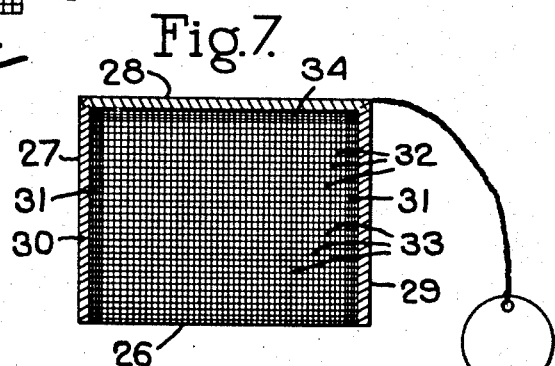
Fig. 7 is a view of a sewed bag embodying my invention.

In Fig. 7 I have illustrated a sewed bag 25 which is made by folding an oblong bag blank of fabric along a central transverse line to make a fold 26, and then sewing together the mating edges 27, 28, 29 of the two parts of the blank by means of stitches 30. The bag blank from which this sewed bag is made is woven from a fabric in which the warp threads 31 at the marginal edges 27, 29 are much closer together than the warp threads 32 forming the central portion of the blank. In weaving the fabric the filling threads 33 may be beaten up so that they produce with the more widely separated warp threads 32 a fabric for the body of the bag which has a sufficiently close weave to meet the requirements of a coffee bag or tea bag. Because of the fact that the warp threads 31 at the sides of the fabric are closer together than the warp threads of the body of the fabric, it will follow that the marginal portions 27, 29 will be more finely woven than the body of the fabric and such marginal portions will be sufficiently firm to make a proper anchorage for the stitches 30. If desired, the marginal portion 34 of the fabric along the edge 28 may be more closely woven than the body of the blank so as to produce a closely woven edge portion 34 to receive the stitches along the edge 28. A sewed bag, such as shown in Fig. 7, can be made at less expense than one in which the body portion of the blank, as well as the marginal portions, are made from the very closely woven fabric heretofore used.

While I have described particularly herein a bag made of fabric, yet the invention is not limited to the use of fabric as a bag material as the bag can be made from bag blanks of other materials, which blanks have certain portions thereof more porous than other portions so that when the blank is formed into a bag, the portion of the walls of the bag adjacent its mouth will be more porous than the portion of the wall forming the body of the bag.

I claim:
1. A bag of the pouch type for containing material for making a cup of infusion, which bag has a portion of the walls thereof adjacent its mouth more porous than the portion of the wall forming the body of the bag.

2. A bag for containing material for making a cup of infusion, which bag is formed by gathering together and fastening in their gathered-together relation the edges of a bag blank, portions of the walls of the bag adjacent the gathered-together edges being more porous than the portions of the walls forming the body of the bag.

3. A bag for containing material for making a cup of infusion, which bag is formed by gathering together and fastening in their gathered-together relation the edges of a bag blank of fabric, portions of the walls of the bag adjacent the fastened-together edges being less closely woven than the portion forming the body of the bag.

4. The process of making a bag containing material for making a cup of infusion, which process consists of providing a bag blank having its marginal portion more porous than the central portion, gathering the edges of the blank together to form a bag and filling the bag with the material for making the infusion, and applying a fastening device to the gathered-together edges at a point where a portion at least of the more porous part of the blank will be below the fastening device.

5. The process of making a bag containing material for making a cup of infusion, which process consists in providing a bag blank of fabric having the marginal portions thereof less closely woven than the central portion, gathering the edges of the blank together to form a bag and filling the bag, and then applying a fastening device to the gathered-together edges at a point where some at least of the less closely woven portions of the fabric of the bag will be below the fastening device.

6. A bag for containing material for making a cup of infusion, which bag is made from a one-piece blank of bag material having its edges secured together, the portion of the blank adjacent the edges thereof being more porous than the central portion of the blank, thereby making the bag in which the portion of the walls thereof adjacent the point where the edges of the blank are secured together are more porous than the portion forming the body of the bag.

RALPH N. DOBLE.